United States Patent [19]
Tevick

[11] 3,824,609
[45] July 16, 1974

[54] COLOR MICRO OPTIC APPARATUS
[75] Inventor: George J. Tevick, Leonia, N.J.
[73] Assignee: Personal Communications, Inc., Stamford, Conn.
[22] Filed: Feb. 14, 1973
[21] Appl. No.: 332,284

[52] U.S. Cl............ 354/102, 95/12.2, 95/37, 352/66, 352/67
[51] Int. Cl. ........................................ G03b 33/14
[58] Field of Search .......... 95/12.2, 37; 352/66, 67; 355/32, 33, 88

[56] References Cited
UNITED STATES PATENTS
1,872,501  8/1932  Rehlander.......................... 95/12.21
2,382,604  8/1945  Capstaff et al...................... 355/33
3,641,895  2/1972  Bestenreiner et al.............. 95/12.21
3,712,724  1/1973  Courtney-Pratt................... 95/37 X Primary Examiner—Richard L. Moses

[57] ABSTRACT

A color micro optic apparatus which employs black and white photographic film in taking and yet produces color images upon readout. Distributed sets of contiguous color filters, each set having (for example) red, green, and blue filters, are sequentially aligned with corresponding sets of lensettes of microfiche. In use as a camera, red light activates only those emulsion portions of the microfiche which are beneath the red filters, similar discrimination occurring with the blue and green filters. After the emulsion is developed only those emulsion areas beneath filters which have passed light are transparent. For readout, the developed emulsion and filters receive white light (in the opposite direction) to reconstruct a color image.

17 Claims, 13 Drawing Figures

CODE
LB — LEFT EYE BLUE
LR —  "  "  RED
LG —  "  "  GREEN
RB — RIGHT EYE BLUE
RR —  "  "  RED
RG —  "  "  GREEN

3 COLOR HEXAGONAL LAYOUT

IMAGE PLANE OF PHOTOGRAPHIC OBJECTIVE 40

COLOR MICRO OPTIC APPARATUS

This invention relates to a micro optic camera and reader apparatus which will produce color images while permitting the economy of black and white photographic film.

The need for high resolution colored photographs and motion picture films is well known. However, at the present time, the cost of such photographs and films has been relatively high. Further, the demand for colored illustration using only black and white recorded information is great. It is well known that books or other intelligence which contain colored illustrations are much appealing than non-colored texts. It is also known that the attraction for color illustrations having intense brillance is extraordinary. Apparently, the average person is esthetically pleased by extreme color brightness or brillance in his vision. While high resolution color photogrpahic apparatus and schemes are known, their cost is relatively high and hence enjoy only limited application.

A microfiche is provided with a plurality of integral lenses (lensettes) on its top surface. The bottom surface carries a photographic emulsion. Such a device having integral lenses is termed a lensfiche. The top surface of the lensfiche between the lensettes, termed the interlensette surface, is preferably coated with an opaque material. A slidable opaque mask having distributed apertures therein is positioned on top of the lensfiche, with the apertures in the mask aligned with one set of the lensettes. In using the apparatus as a readout device, a projection screen is spaced from the opaque mask and when illuminated from the rear light passes through the emulsion and lensettes and through the distributed apertures in the opaque mask. An image appears on the screen and is a greatly magnified image of that contained in the photographic emulsion. According to the practice of the present invention, each distributed aperture in the opaque mask is provided with a contiguous set of color filters, each set including, for example, a red and a blue and a green filter. Each filter overlies a corresponding lensette in the lensfiche.

When the apparatus is used as a camera, scattered light from an object to be photographed passes to the filters. If, for example, a portion of this light falling upon one zone of the lensfiche contains only blue and red wave lengths, the photographic emulsion immediately beneath and in optical alignment with the blue and red filters in this zone will be activated. The emulsion corresponding to the green filters in this zone will not be activated. The same action, depending upon the colors from the object being photographed, will occur at all other zones of the lensfiche. After the emulsion is developed, reconstitution is made by illuminating the emulsion in the reverse direction with white light.

The invention may also be employed to yield color images in three dimensions. Instead of the distributed apertures, each having one set of color filters (such as red, green, blue) they carry two such sets. The left color filters of each set are exposed, then the right color filters of each set. After emulsion development, mutually orthogonal polarizing screens are placed, respectively, over the left and right color filter sets. Viewing through correspondingly polarized binoculars produces the desired effect.

The real object or scene to be recorded may be termed a macro scene, while the developed emulsion of the microfiche carries images termed micro images.

Figure 1:
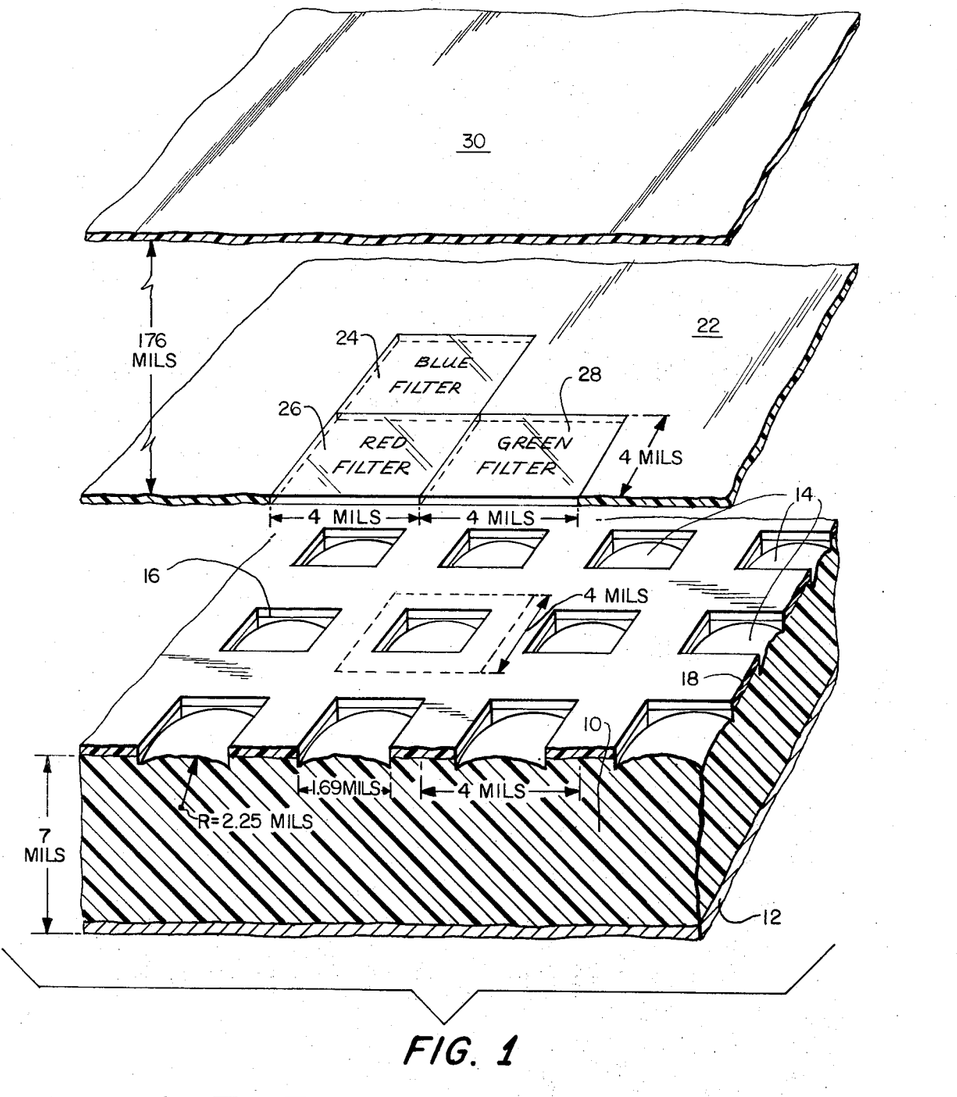
FIG. 1 is a partial perspective view of a portion of the micro optic apparatus of this invention.

Referring now to the drawings, the numeral 10 denotes a microfiche formed of a transparent material such as methyl methylacylate and provided on its top surface with a plurality of integral lenses 14. Because of their small size, these lenses are termed lensettes. The lensettes are embossed, molded, or otherwise formed adjacent the top surface of microfiche 10 and lie generally below its top surface, being positioned in recesses 16. An opaque coating 18 covers the remainder of microfiche 10, this remainder being the interlensette surface. As indicated in FIG. 1, an example is shown wherein each lensette 14 has a diameter of 1.69 mils and each recess 16 is a square of this dimension on a side. Although a square aperture is shown, circular or hexagonal shapes may be used. These apertures form aperture stops. In some plastics where the index of refraction changes rapidly with the wavelength, it may be desirable to have different radii for the lensettes associated with different filters. The radius of curvature of each lensette 14 for this example is 2.25 mils, while the area beneath each lensette 14 on the photographic emulsion 12 (on which information is to be stored and later projected) is 4 mils by 4 mils, as indicated by the dashed lines which appear in FIG. 1 on the top of microfiche 10. The lensettes are on 4 mil centers.

The numeral 22 denotes an opaque mask of any desired material, such as metal or plastic, and includes indicated color filters 24, 26 and 28. Each filter is transparent to a narrow band of wavelengths and is substantially opaque to all optical wavelengths outside of this range. Each filter may be square having a dimension of 4 mils on each side. The numeral 30 schematically denotes a viewing screen (where the apparatus of FIG. 1 is used as a readout device) and is spaced, in the example given, 176 mils from the top surface of microfiche 10. In practice, the opaque mask 22 may be coated on its bottom surface with transparent antifriction material such as Teflon and placed in sliding contact with the top surface of microfiche 10. Mask 22, in the example given may be defined by the (opaque) bottom surface of a plastic and transparent sheet 176 mils thick, the top surface of which defines viewing screen 30.

Figure 2:
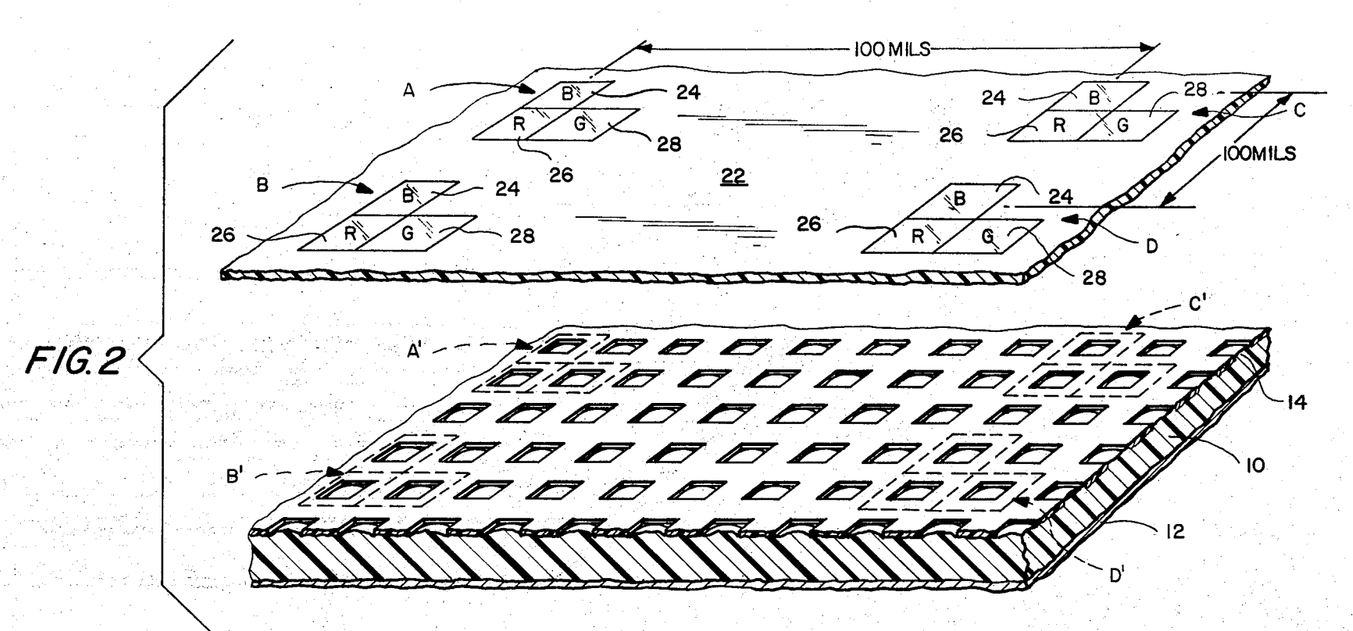
FIG. 2 is a view similar to FIG. 1 but on a somewhat larger scale.

Referring now to FIG. 2 of the drawings, the same elements are illustrated but on a larger scale. FIG. 2 illustrates four sets of color filters 24, 26 and 28, each of which corresponds identically to the set illustrated at FIG. 1 of the drawings. Each set (a triad in the case of three primary color filters) is spaced 100 mils from its neighbor in the example given. In FIG. 2, the four sets occupy the corners of an imaginary square 100 mils on a side. The four triads or sets of color filters illustrated at FIG. 2 are denoted by the letters A, B, C, D, on mask 22, while their imaginary projections on microfiche 10 are illustrated by dashed lines thereon and are denoted, respectively, by A', B', C', D'.

While more complete descriptions of the apparatus will be later more fully set out, the following explanation will illustrate the basic operation when used as a camera. Assume that mask 22 is placed flat against the top of microfiche 10, with the color filter sets A, B, C, D, in optical registry or alignment with their corresponding lensettes 14, as indicated by the imaginary projections A', B', C', D' of FIG. 2. Each color filter is hence optically aligned with a single lensette 14. Reflected light of a variety of wavelengths from an object to be photographed is now incident (through suitable optical apparatus later to be described) on the color filter sets A, B, C, D. If the region or zone of mask 22 which contains set A is struck by green light but no blue or red light, then filter 28 of this set will pass light and its corresponding lensette 14 will receive light to thereby activate the photographic emulsion 12 immediately below. Assuming no other wavelengths, the blue and red filters will not transmit (the green light) and their corresponding lensettes 14 will receive no light and accordingly the photographic emulsion 12 immediately beneath these latter two lensettes will not be activated.

Assume now that the photographic emulsion 12 is developed. After such development, the region thereof which was associated with the green filter 28 of set A will be transparent, and the regions associated with filters 24 and 26 will be opaque. Accordingly, upon reconstruction by illuminating the developed emulsion 12 rearwardly and towards the screen 30 with white light, filters 24 and 26 will not transmit, while filter 28 will transmit (green) light upwardly to the viewing screen.

Similar action occurs at the other illustrated sets such as B. For example, if light incident upon region or zone B of mask 22 contains blue and red light, but no green light, then the areas of the photographic emulsion 12 associated with these two filters would be activated, while the emulsion region associated with the green filter would not be activated. Upon emulsion development, the areas associated with the blue and red filters will be made transparent, while the region associated with the green filter will be opaque. Upon rearwardly illuminating the now developed photographic emulsion 12 with white light, no light will pass the green filter of set B through its associated lensette 14, while the lensettes associated with filters 24 and 26 will transmit light, and colors associated with filters 24 and 26 will appear immediately above on screen 30.

The reader is now in a position to comprehend that the same action occurs with the other two illustrated filter sets C and D. In practice, a typical lensfiche 10 would be 5 inches × 7 inches and accordingly the mask 22 contains thousands of such filter sets A, B, . . . etc., and the same action occurs at each. (For the 5 inches × 7 inches example, 3,500 sets).

Figures 3A, 3B, 3C, 4:
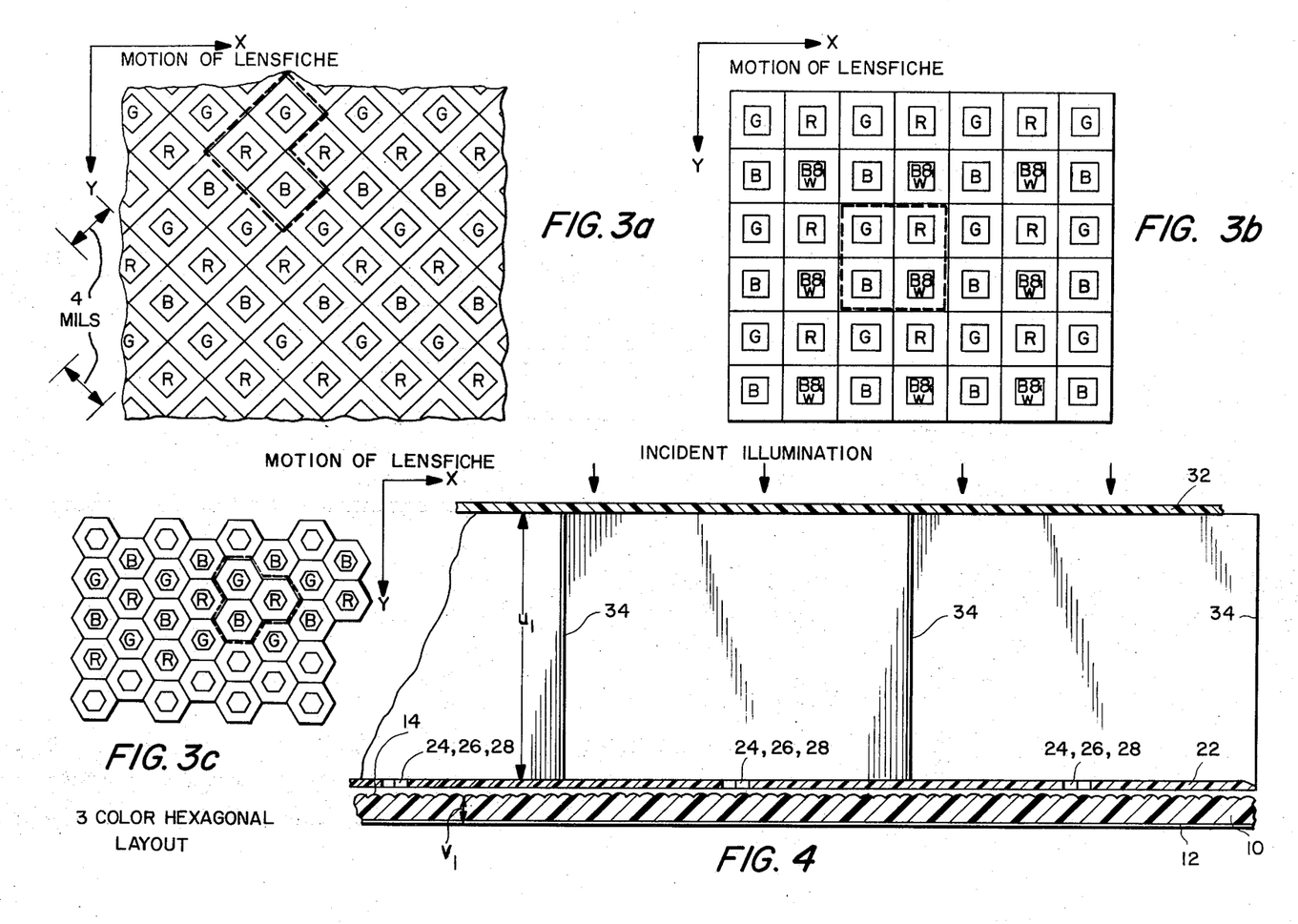
FIGS. 3a, 3b, 3c illustrate various color filter patterns and arrangements on the opaque mask or on the lensettes themselves.
FIG. 4 is a partial elevation view of the apparatus when used as a camera.

For photographically recording the next scene, the fiche 10 is now moved 4 $\sqrt{2}$ mils at an angle of 45° to the horizontal in the example shown at FIG. 2 and as shown at FIG. 3a. A different set of lensettes 14 on the microfiche 10 will now be in registry with the color filters 24, 26, 28 of all the sets A, B, C. D, etc., such a letter set might be denoted by A'', B'', C'', D''. Now the fresh set of lensettes 14 with their corresponding emulsion areas therebeneath is available and the next scene recorded in the manner just described.

With the illustrated dimensions and parameters, and with a reduction ratio of 25, a 100 mil times 100 mil area on viewing screen 30 corresponds to a 4 mil times 4 mil object area on photographic emulsion 12, each such emulsion area associated with a single lensette 14. There are accordingly 625 lensettes in the 100 mil times 100 mil area and three such lensettes are associated with each color scene. Thus, a total of 625/3 = 208 color scenes may be recorded before the storage capacity of photographic emulsion 12 is exhausted. In the event that four color filters are employed, the number of scenes capable of being recorded less, being 625/4 = 156.

FIGS. 3a, 3b, and 3c schematically indicate additional color filter patterns which may be employed. In each instance, a single color filter set is surrounded by dashed lines. The remaining squares or hexagons correspond to lensettes over which the color filters are sequentially positioned. No matter what set configuration is selected, each is, in the example given, spaced 100 mils from its neighbor set. In FIG. 3a, three filters are used in the configuration of FIGS. 1 and 2, but mask motion relative to the microfiche is displaced 45°. In FIG. 3b, a fourth element of the three-filter filter set is shown and is simply an adjacent, uncovered aperture in the mask 22 and is denoted by B & W. In combination with the three additive colors, it functions so as to control brilliance. In FIG. 3c, the color filters are hexagonal. With such a filter configuration the mask openings 16 may also be hexagonal.

From a consideration of FIGS. 1 and 2, it will be apparent that the color filters may be coated onto lensettes 14, or otherwise be carried by the microfiche 10. The filter material could, for example, be placed between the emulsion 12 and the base of microfiche 10. The groups A, B, etc., shown in FIG. 2, would then each be replaced by a single aperture having an outline corrrsponding to the particular filter pattern chosen.

FIGS. 4–7 illustrate four different ways of taking pictures, i.e., recording information, according to the practice of this invention.

Referring now to FIG. 4 of the drawings, the numeral 32 denotes a color transparency film positioned parallel to opaque mask 22. Numeral 34 represents any one a number of septa which may assume the form of intersecting rectangular sheets, which define a cell for each color filter set, and coated on both sides with a light absorbing substance. The remaining elements correspond to those illustrated at FIGS. 1 and 2 and bear the same reference characters. The septa function as field stops. The field stops may also be placed in the emulsion.

In operation of the camera arrangement illustrated at FIG. 4, the color transparency 32 lies on the object plane of each lensette 14 of microfiche 10. When illuninated by light scattered by an object to be recorded, three images in each set, each reduced 25 times in the example given, are recorded directly on emulsion 12 in the manner previously described. The method illustrated is obvious and no further discusion is required.

Figure 5:
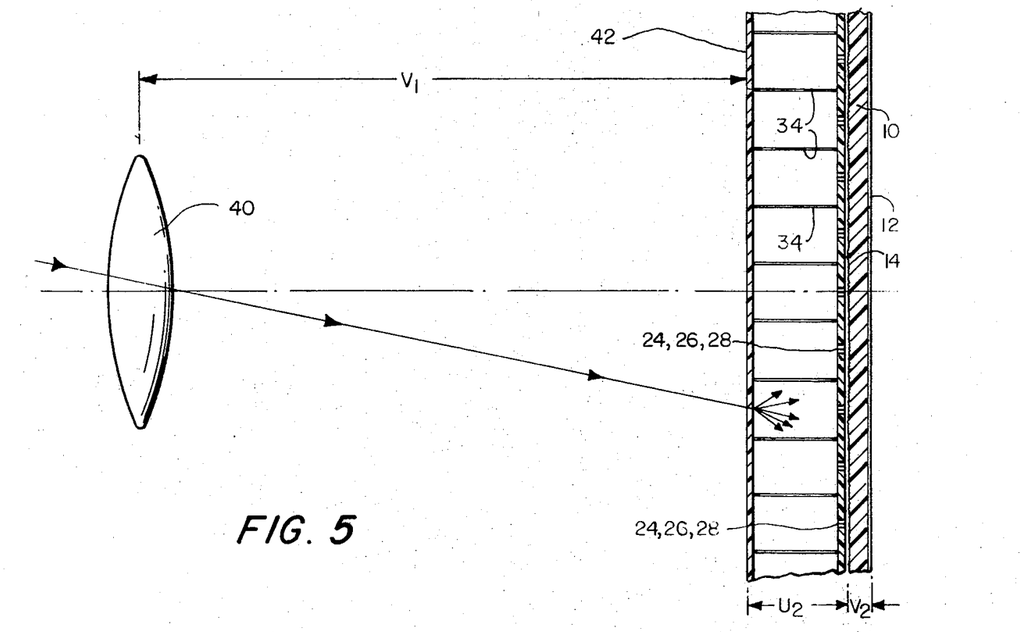
FIGS. 5 – 7 are views similar to FIG. 4 and illustrate three modifications of the apparatus when employed as a camera.

Referring now to FIG. 5 of the drawings, another method of taking pictures is illustrated. A photographic lens objective denoted by the numeral 40 forms an image on a translucent, light scattering screen 42. The image on screen 42 acts as an object for the emulsion 12. In essence, the image formed by the objective on screen 42 is scattered by the screen, the screen functioning as a rear projection screen. The object distance is denoted by $u_2$, the distance between the screen and lensettes 14. The image distance is denoted by $V_2$ and is the distance between the lensettes 14 and emulsion 12. Again, the mode of operation is believed to be self-evident and further explanation will accordingly not be given. It is important to note that if the screen 42 is strongly scattering in the forward direction, i.e., towards the microfiche 10, the amount of light entering lensettes 14 will be enhanced and exposure time can be accordingly small.

Figure 6:
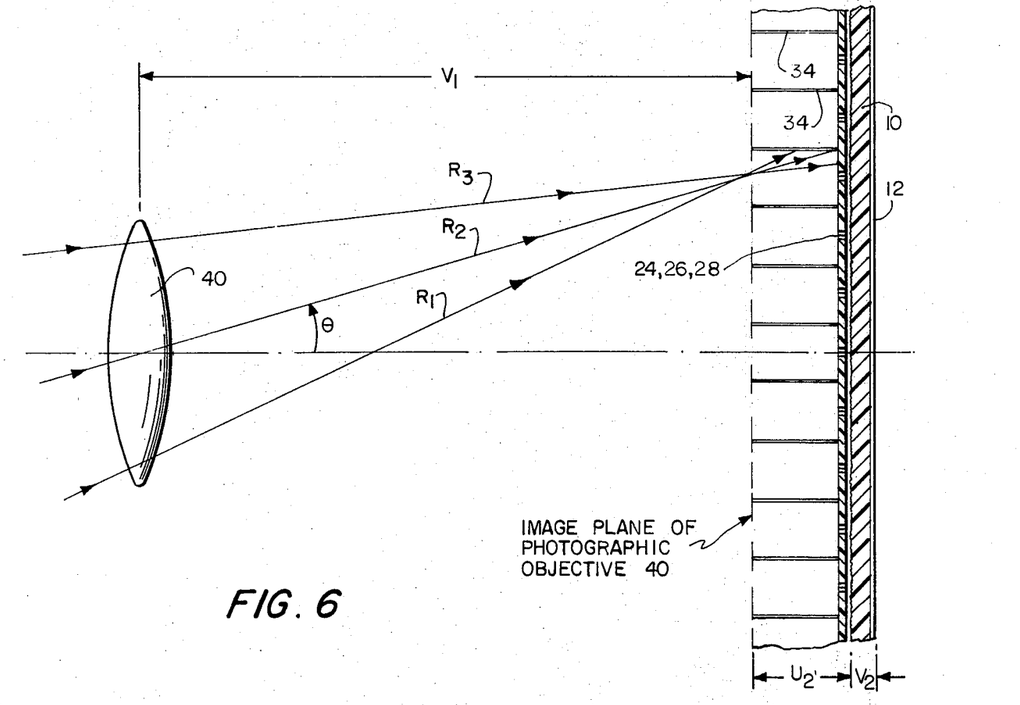

Referring now to FIG. 6 of the drawings, another method of employing the apparatus as a camera is illustrated. Here, the numeral 40 as before, denotes a photographic objective of conventional construction. Instead of screen 42, light-absorbing septa plates 34 extend at right angles to the emulsion to define an imaginary plane by their left edges. This plane is the image plane of photographic objective 40 and is denoted at distance $v_1$ away from lens 40. Objective lens 40 forms an image which acts as multiple objects for lensettes 14. If the image includes relatively large angle rays with respect to the optic axis of lens 40, such as ray $R_1$, then the rays entering into the various cells defined by septa 34 will be absorbed. None of these rays will strike the particular color filter set associated with each septa cell. Thus, light rays $R_2$ and $R_3$ will be recorded on emulsion 12, while $R_1$ will have been absorbed by one of septa 34 and will not be recorded.

Figure 7:
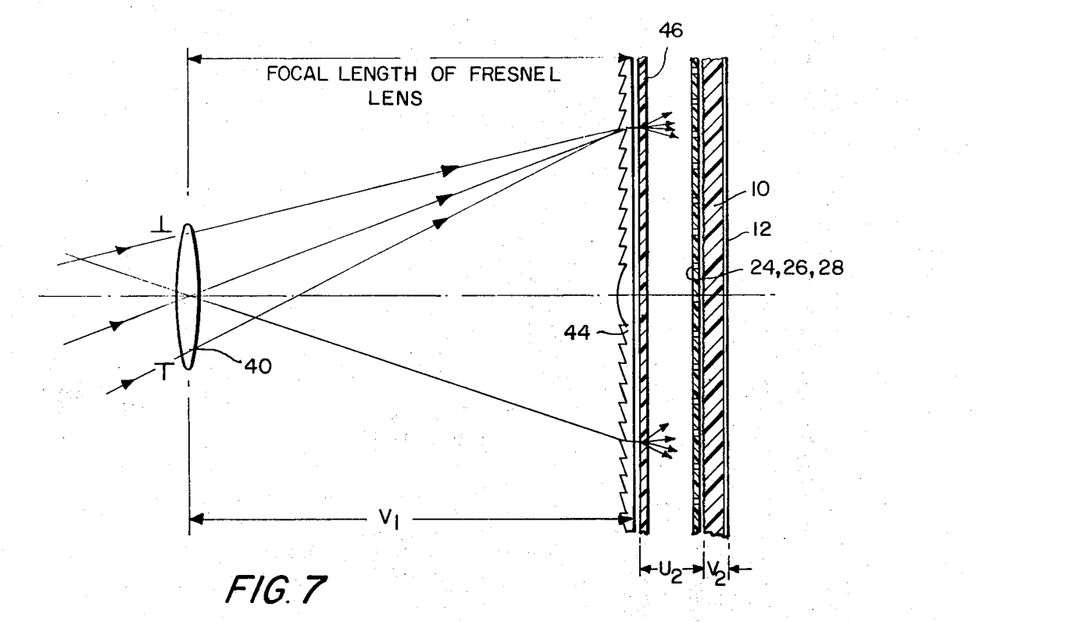

Referring now to FIG. 7 of the drawings, still another method of using the apparatus as a camera is illustrated, here using a Fresnel lens. The numeral 44 denotes a conventional Fresnel lens as is illustrated in combination with a light scattering screen 46 which passes and scatters the light from photographic objective 40 through the microfiche 12 as illustrated. The use of the Fresnel lens solves the problem of large angle rays, thereby decreasing the requirement for the use of septa 34. In the arrangement illustrated at FIG. 7, the Fresnel lens has essentially the same focal length as that of lens 40 and functions to bend the principal rays from different parts of an object into parallel rays, these latter rays passing through the microfiche 10 via the several sets of color filters 24, 26, 28. If desired, however, septa 34 may be employed in the embodiment of FIG. 7.

It is believed evident that after the emulsion 12 has been developed, reversal of the process shown in the preceding figures, and as previously described, serves to reconstruct or project the information for readout purposes.

Figure 8:
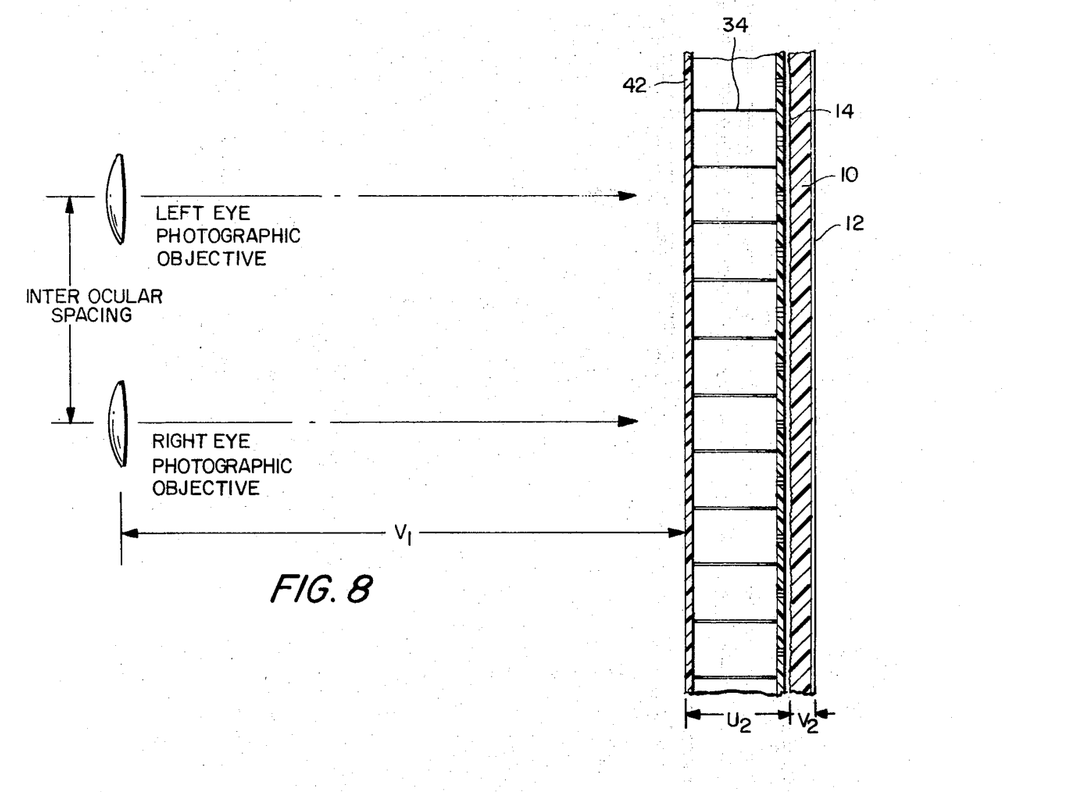
FIG. 8 is a view similar to FIG. 4, but showing the apparatus as a three-dimensional color camera.
Figure 9:
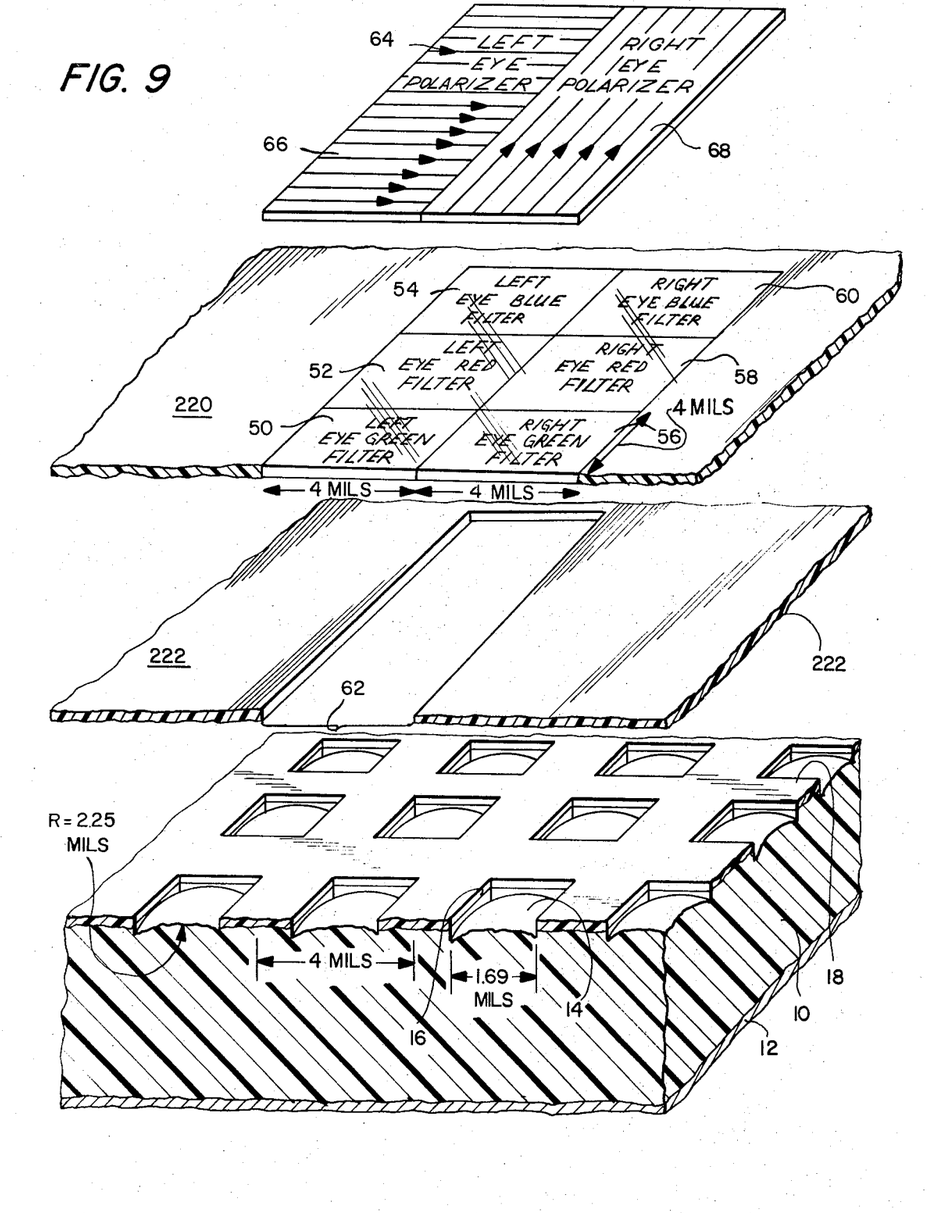
FIG. 9 is a view similar to FIG. 1 and illustrates the microfiche detail when modified to yield three-dimensional color effects.

Referring now to FIGS. 8 and 9 of the drawings, a technique and modification will be described wherein three dimensional (3D) color viewing is possible. Referring now to FIG. 8, two photographic objectives are employed as indicated and are spaced laterally apart from a distance corresponding to the interocular distance of the human eye. The left eye is represented by one of the lenses and the right eye by another. Referring now to FIG. 9 of the drawings, an apertured opaque mask 220 having two sets of color filters (in each distributed aperture) indicated by the numerals 50–60 are positioned parallel to microfiche 10. The arrangement is substantially the same as indicated in FIG. 1 of the drawings. In addition, a second mask 222 is positioned between microfiche 10 and mask 220. A slot 62 is provided for each of the color filter sets which are distributed throughout opaque mask 220. Each slot 62 is one filter unit wide and three filter units long and in the example given is accordingly 4 mils wide and 12 mils long. The mask 222 is slidable relative to mask 220 a distance of 4 mils and assumes, alternately, a position exposing one or the other of the two sets of left and right filters, i.e., either the set corresponding to the left eye or the set corresponding to the right eye.

For readout, a polarizer 64 having a horizontal polarizing portion 66 and a vertical polarizing portion 68 is positioned over each of the distributed color sets throughout the mask 220. Thus, the left eye polarizing area 66 overlies the three left eye filters 50, 52, 54 while the vertical polarizer covers the right eye filter 56, 58, 60.

The taking process is accomplished in the following manner. For a single scene which is to be photographed, the right eye photographic objective (see FIG. 8) is covered so that no light through it passes onto light diffusing screen 42. All of the light thus falling on screen 42 must come from the left eye photographic objective. Mask 222 is now positioned as indicated so that the mask covers all of filters corresponding to the right eye, thus exposing the left eye filter 50, 52, 54. Each filter overlies and corresponds to one lensette 14 in microfiche 10.

After the scene is taken in this manner, the photographic objective corresponding to the left eye is closed, see FIG. 8, and the other objective is open. Light now strikes screen 42 through right eye photographic objective only and mask 222 is moved relative to mask 220 so as to expose only the triad of light filters corresponding to the right eye.

This completes the taking operations for one scene and for the next scene mask 220 and its associated mask 222 is moved a distance of 8 mils from the illustrated portion at FIG. 9 so that the next two rows of lensettes 14 are now ready for exposure.

After the emulsion has been developed and in order to view the three-dimensional scenes which have been recorded, the mask 222 is omitted, thus exposing all six lensettes which have been associated with a particular scene to the color filters carried by mask 220. A polarizer 64 is placed over each set of color filters, with left part 66 overlying the left eye filters, the right part 68 overlying the right eye filters. The viewer wears polarized eyeglasses, with the left lens being horizontally polarized and the right lens being vertically polarized, corresponding to polarizing element 64 of FIG. 9. Because of the polarized lenses, the left eye sees only the "picture" as viewed by the left eye photographic objective, and the same is true for the right eye. As in the previously described embodiment of FIGS. 1 and 2, the color filter set illustrated is only one of thousands throughout the opaque mask. Alternatively, and also as previously described, the color filters may be coated on the lensettes 14 or between the emulsion and the microfiche.

Figure 10A:
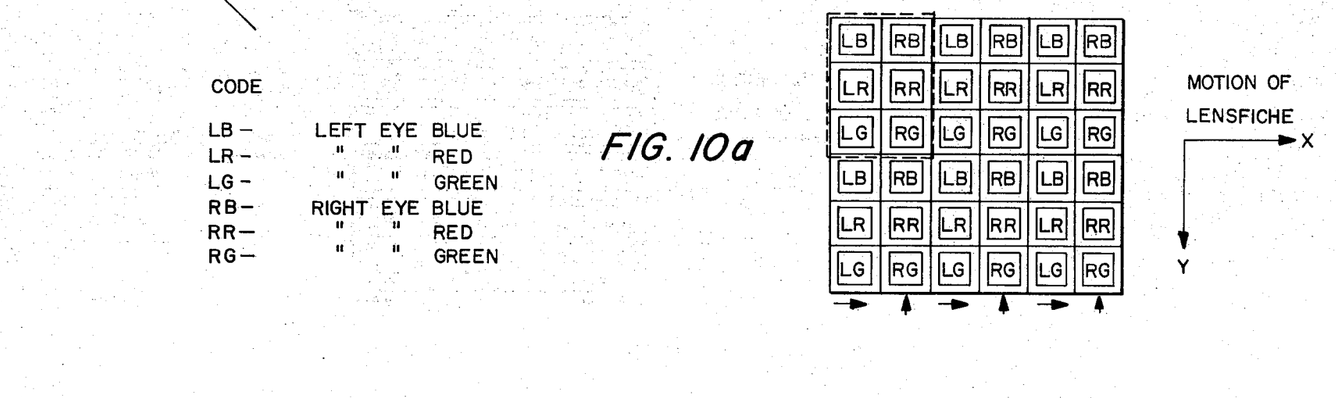
FIGS. 10a, 10b illustrate color filter patterns and lensfiche motion for the apparatus of FIG. 9.
Figure 10B:
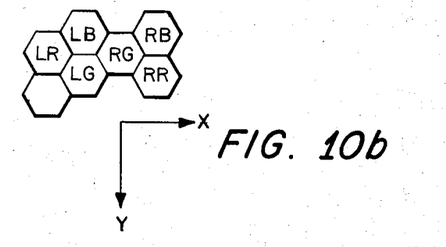

FIGS. 10a and 10b illustrate patterns of color filters for the three-dimensional embodiment.

The taking of three-dimensional color photographs may also be done without the duplicate set of color filters illustrated at FIG. 9. Using a single set of color filters, the left eye objective only of FIG. 8 (for example) passes light from a macro scene to a mask having a plurality of single (as opposed to duplicate) sets of distributed color filters, such as that of FIG. 1. After exposure, the right objective only of FIG. 8 passes light to the now indexed microfiche, to thereby expose an adjacent and distinct set of lensettes and their associated emulsion areas. This twostep process is repeated for each scene and yields the same result as that obtained with the apparatus of FIG. 9. In this latter method, the mask 222 is not required. Upon readout, however, a mask such as 220 is required, as are the polarizer 64 and polarized eyeglasses.

It will be apparent that after one microfiche has been fully recorded and its emulsion developed, a master or prototype plate may be formed for the purpose of making duplicates. Such duplicates may be then suitably affixed to a microfiche 10, in lieu of an emulsion, for mass production purposes. Accordingly, the phrase "photographic emulsion" as used in the claims is intended to embrace (a) an undeveloped emulsion (b) a developed emulsion (c) a print of a developed emulsion.

I claim:

1. A micro optic apparatus for recording or for reading out micro images in color, said apparatus including, a. a lensfiche, said lensfiche defined by a transparent sheet having a plurality of interspaced lensettes on its top surface thereof and a photographic emulsion on its bottom surface,
   b. a mask positioned adjacent the top of said lensfiche and parallel thereto,
   c. said mask having a plurality of sets of color filters spaced over its surface, each color filter set defined by a plurality of single-color, color filters,
   d. each color filter adapted to be optically aligned with a single lensette,
   e. the number of color filters in each color filter set multiplied by the number of color filter sets being less than the number of lensettes,
   f. said color filter sets being movable parallel to said lensfiche, whereby such movement aligns the color filters with different sets of lensettes.

2. The apparatus of claim 1 including,
   a. an opaque coating on the top of said lensfiche covering the interlensette surface thereof.

3. The apparatus of claim 1 wherein the lensettes corresponding to and associated with each set of color filters are not all of the same radii of curvature, to thereby compensate for variation in retractive index with variation of wavelength.

4. The apparatus of claim 2 wherein the lensettes corresponding to and associated with each set of color filters are not all of the same radii of curvature, to thereby compensate for variation in retractive index with variation of wavelength.

5. A micro optic apparatus for recording or for reading out micro images in color, said apparatus including, a. a lensfiche, said lensfiche defined by a transparent sheet having a plurality of interspaced lensettes on its top surface thereof and a photographic emulsion on its bottom surface,
   b. a plurality of sets of color filters the filters of each set arranged among themselves in a pattern,
   c. an opaque mask having a plurality of through aperture sets distributed thereover, each aperture set having an outline corresponding to the pattern of each color filter set, said mask positioned to overlie the top of said lensfiche, said mask and lensfiche being relatively movable so that the mask apertures are, successively, aligned with different sets of lensettes upon such relative motion, the number of sets of mask apertures multiplied by the number of apertures in each aperture set being less than the number of lensettes,
   d. each color filter being in optical alignment with a single lensette.

6. The apparatus of claim 5 including,
   a. an opaque coating on the top of said lensfiche covering the interlensette surface thereof.

7. The apparatus of claim 5 wherein said color filters are coated on said lensettes.

8. The apparatus of claim 5 wherein said color filters are carried by said opaque mask.

9. The apparatus of claim 5 wherein said color filters are positioned beneath said lensettes.

10. The apparatus of claim 7 including,
    a. an opaque coating on the top of said lensfiche covering the interlensette surface thereof.

11. The apparatus of claim 8 including,
    a. an opaque coating on the top of said lensfiche covering the interlensette surface thereof.

12. The apparatus of claim 9 including,
    a. an opaque coating on the top of said lensfiche covering the interlensette surface thereof.

13. The apparatus of claim 5 wherein the lensettes corresponding to and associated with each set of color filters are not all of the same radii of curvature, to thereby compensate for variation in retractive index with variation of wavelength.

14. The apparatus of claim 6 wherein the lensettes corresponding to and associated with each set of color filters are not all of the same radii of curvature, to thereby compensate for variation in retractive index with variation of wavelength.

15. A method of color recording macro scenes on a microfiche which carries a plurality of lensettes and which is provided with a photographic emulsion beneath said lensettes, including the steps of:
    a. projecting a macro scene through distributed sets of laterally spaced color filters, each color set having a plurality of color filters, each color filter being in optical alignment with a single lensette, the number of color filters times the number of color filter sets being less than the total number of lensettes.

16. The method of claim 15 including the additional later step of moving said fiche relative to said mask to thereby align a different unique set of lenses with the mask apertures, and then projecting a second macro scene, this additional step being repeated for each different macro scene recorded on the emulsion.

17. The method of claim 12 wherein the first and second mentioned macro scenes, as viewed by said microfiche, are spaced apart a distance equal to the human interocular distance, whereby three-dimensional color effects may be obtained upon readout.

* * * * *

PO-1050
(5/69)

UNITED STATES PATENT OFFICE
CERTIFICATE OF CORRECTION

Patent No. 3,824,609      Dated July 16, 1974

Inventor(s) George J. Yevick

It is certified that error appears in the above-identified patent and that said Letters Patent are hereby corrected as shown below:

The name of the inventor is changed from:

George J. Tevick to -- GEORGE J. YEVICK --

Signed and sealed this 24th day of September 1974.

(SEAL)
Attest:

McCOY M. GIBSON JR.
Attesting Officer

C. MARSHALL DANN
Commissioner of Patents